(Model.)

E. PRESCOTT.
SHUTTER WORKER.

No. 308,698. Patented Dec. 2, 1884.

Witnesses.
John F. C. Prinkert
Henry Marsh.

Inventor.
Edwin Prescott.
by Crosby & Gregory attys

UNITED STATES PATENT OFFICE.

EDWIN PRESCOTT, OF ARLINGTON, MASSACHUSETTS.

SHUTTER-WORKER.

SPECIFICATION forming part of Letters Patent No. 308,698, dated December 2, 1884.

Application filed February 11, 1884. (Model.)

*To all whom it may concern:*

Be it known that I, EDWIN PRESCOTT, of Arlington, county of Middlesex, and State of Massachusetts, have invented an Improvement in Shutter-Operators, of which the following description, in connection with the accompanying drawings, is a specification, like letters on the drawings representing like parts.

This invention has for its object the production of an apparatus for opening and closing outside shutters from within a building without lifting the usual sash. To do this I employ an inclined shaft, placed in or extended through the window-casing, the said shaft having at one end a projection or crank which co-operates with a swivel-piece having its bearings in a suitable plate or eye-piece attached to the shutter, the point of connection of the swivel-piece with the said plate being substantially in line with the center of the said diagonal shaft, the centers of motion of the diagonal shaft and of the said swivel being substantially at right angles. The diagonal shaft is operated by a pivoted drop-handle adapted to be lowered to hold the said shaft and the shutter in desired position.

Some novel combinations of parts herein shown are not herein claimed, but expressly reserved for the application filed September 26, 1884, Serial No. 144,085; and the subject-matter of invention herein is specifically set forth in the claims hereof.

Figure 1:
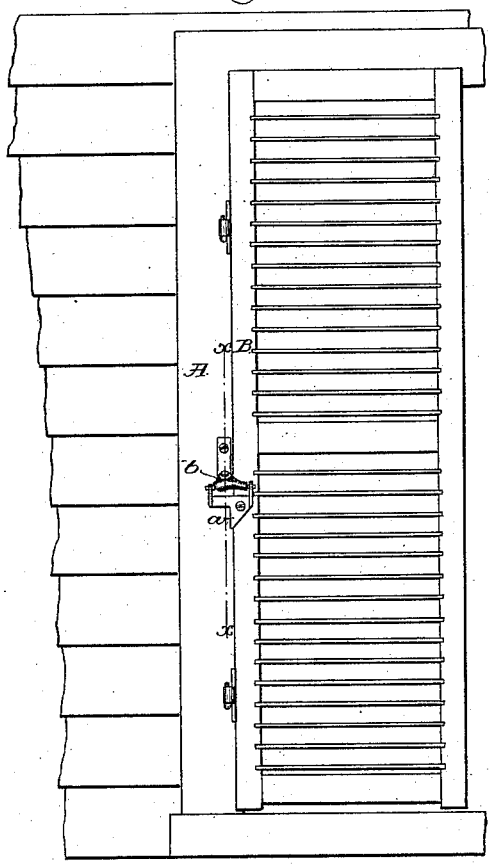
Figure 2:
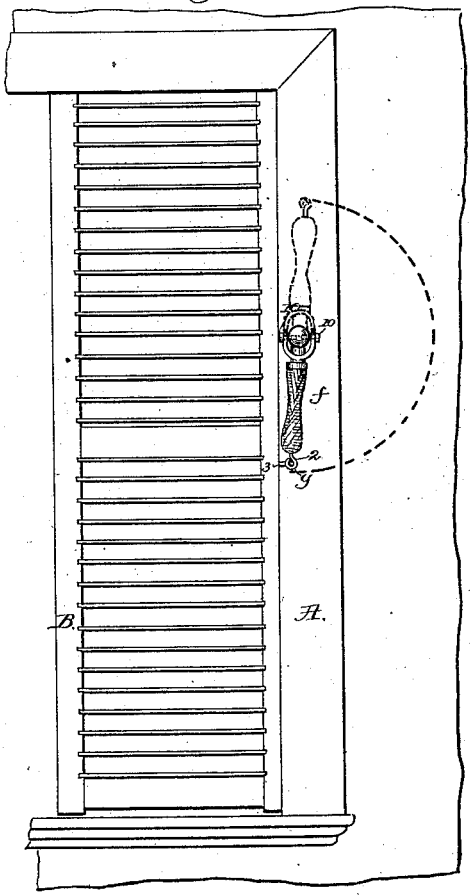
Figure 3:
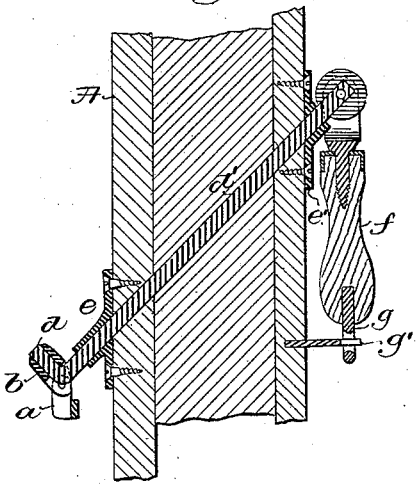
Figure 4:

Figure 1 is an outside elevation of a sufficient portion of a building to show a shutter provided with mechanism embodying my invention. Fig. 2 is an inner side view of the same with the shutter closed. Fig. 3 is an enlarged sectional detail of part of the same on the line $x$ $x$, and Fig. 4 a detail of the locking device for the drop-handle.

The window-casing A and shutter B are and may be of any usual construction. The shutter may be provided with any suitable hinges. Upon the shutter B, at one edge, I apply a plate or eye-piece, $a$, attaching the same by suitable screws, the said plate receiving and holding loosely the swivel-piece $b$, herein shown as a piece of metal having end journals fitted into openings on the said plate or eye-piece, and having a hole or socket suitable to receive a projection or crank, $d$, at the outer end of the diagonally-placed shaft $d'$, held in suitable bearings, $e$ $e'$, attached to the window-casing. The inner end of the shaft $d'$ has pivoted to it the upper end of a drop-handle, $f$, having an attached eye, $g$, one or the other side of which is adapted to rest against the prong 3 when the shutter is closed, and to rest against the prong 2 of the hook $g'$ when the shutter is open, the said eye and hook constituting a locking device for the handle. As shown in Fig. 2, the left-hand side of the eye $g$ bears against the right-hand side of prong 3, and the shutter is closed and held firmly against the casing; but if the prong 3 were directly in the said eye $g$, then the shutter would not be pressed as closely against the casing. Should the shutter be blown shut, the eye would catch over the prong 3; but to close the shutter more closely it would have to be moved by hand into the position Fig. 2. The eye $g$ operates with the other prong, 2, in like manner when the shutter is open. It will be noticed that the center of the drop-handle is at one side of a line drawn at right angles to the center of its pivot-screws 10, in order that the arc of movement of the drop-handle may be more than the movement of the shutter, to thus enable the shutter to be held firmly in closed or open position without rattling, and without the necessity of different fastening-places for the open and for the closed shutter. The so-called "swivel-piece" intermediate between the plate or eye-piece and the outer end of the diagonal shaft constitutes what may be called a "gimbal-joint," and instead of the particular device shown and called the "swivel-piece" I may employ any other usual gimbal-joint. The handle $f$ being in the position Fig. 2 and the blind being closed, and it being desired to open the same, the handle $f$ will be turned upward, as in dotted lines, and will be turned in the dotted arc into substantially its full-line position, thus rotating the shaft $d$ far enough to enable it, through the swivel-piece and eye-plate, to open the blind.

I am aware that shutter-operators have been made with a rotating rod passing diagonally through the window-casing from the inside to the outside of the building, and having its outer end pivoted by a universal joint to a plate fastened to the shutter, whereby the shutter may be opened or closed from the inside of the building. Therefore I do not broadly claim such construction.

I claim—

1. In a shutter-operator, the plate $a$, having the swivel-piece $b$ pivoted thereon, combined with the diagonal rod $d'$, having the projection or crank $d$ swiveled in said piece $b$, all as shown and described.

2. A shutter-operator consisting of the joint $a\ b$ and rod $d'$, with the projection or crank $d$, combined with the drop-handle having the eye $g$, to be engaged by the hook $g'$, all as and operating as described.

In testimony whereof I have signed my name to this specification in the presence of two subscribing witnesses.

EDWIN PRESCOTT.

Witnesses:
  JOS. P. LIVERMORE,
  G. W. GREGORY.